Patented Mar. 12, 1935

1,993,777

UNITED STATES PATENT OFFICE 1,993,777

MERCURY COMPOUND AND PROCESS OF MANUFACTURING

Max Engelmann and Albert L. Flenner, Wilmington, Del., assignors to E. I. du Pont de Nemours & Company, Wilmington, Del., a corporation of Delaware No Drawing. Original application July 28, 1932, Serial No. 625,526. Divided and this application April 26, 1934, Serial No. 722,513

5 Claims. (Cl. 260—13)

This invention relates to mercury compounds and the process of making them and more particularly to the reaction product of a non-substituted hydrocarbon mercury compound and a salt of a higher fatty acid derived from a saponifiable fat or oil.

The present application is a division of our application Serial No. 625,526, filed July 28, 1932.

We have found that these new compounds can be produced by neutralizing hydrocarbon mercury hydroxides with fatty acids, such for example as those of the oleic, stearic, and palmitic acid series, or the like, or by double exchange of the organic mercury salts with metal salts of fatty acids. We have also found suitable for this purpose other fatty acids derived from a saponifiable fat or oil, such as for example, erucic, linoleic, ricinoleic, alaeomargin, alaesteric, lauric, and sebacic acids. In fact, any fatty acid derived from a saponifiable fat or oil may be used.

These new compounds have been found to be very effective as disinfecting agents and unlike other hydrocarbon mercury salts, such for example, as the chlorides, sulfates, acetates, etc., they are soluble in vegetable or mineral oils. For this reason these new compounds are especially adapted for use in compositions having mineral oils as a constituent, and therefore are useful in cases where, besides having a fungicidal action, an insecticidal effect is desired.

The following examples illustrate methods of manufacturing our new compounds but it is to be understood that these are illustrative only and that other methods will be apparent from the disclosures herein recited.

Example 1

31.3 parts of ethyl mercury hydroxide dissolved in 100 parts of methyl alcohol are neutralized with 37.6 g. of stearic acid, and warmed for five minutes. The methyl alcohol is evaporated on a water bath. After cooling down, the ethyl mercury stearate crystallizes out in flaky crystals which are very similar in appearance to stearic acid. It has a melting point of 72° C. It is insoluble in water but very soluble in alcohol, ether, mineral oils, etc.

Example 2

31.3 parts of ethyl mercury hydroxide are mixed with 37.3 parts of oleic acid and warmed for five minutes on a water bath. After cooling down and standing for a few hours, the ethyl mercury oleate crystallizes out. It has a melting point of 62° C. The new compound is insoluble in water but very soluble in alcohol, acetone, benzene, ether and mineral oils.

Example 3

31.3 parts of phenyl mercury hydroxide dissolved in 200 parts of methyl alcohol are neutralized with 32 parts of palmitic acid. After the methyl alcohol is evaporated under reduced pressure, the phenyl mercury palmitate crystallizes out. It has a melting point of 56° C. It is insoluble in water but very soluble in organic solvents, and mineral and vegetable oils.

In a similar manner, many other mercury compounds of these series may be produced. Likewise, other hydrocarbon mercury compounds, as for example, those in which the hydrocarbon radical is methyl, butyl, propyl, and amyl in their various isomeric forms, may be used, as well as those containing the tolyl-, xylyl and naphthyl radicals.

These compounds may be produced in a form suitable as dust disinfectants by a one-step process without dissolving or suspending the components in a liquid medium by simply bringing the materials of the reaction into intimate contact in a dry state, and preferably in the presence of a finely divided solid diluent such as, some form of inert materials. The mercurizing reaction takes place in the absence of any added liquid diluent and gives directly in dust form the fatty acid salt of the non-substituted hydrocarbon mercury hydroxide.

Illustrative examples of the one-step dry process are as follows:

Example 4

30 parts of ethyl mercury sulfate, 31 parts of sodium palmitate, and 939 parts of talc are ground in a ball mill for four hours.

Example 5

32.7 parts of mercury oxide, 85.4 parts of oleic acid, 24.5 parts of tetra ethyl lead, and 857.4 parts of paraffin oil are mixed together and warmed at 60° C. under agitation for about 2 hours. One part of this mixture containing ethyl mercury oleate added to 300 parts of water and 2 parts of sodium carbonate gives a stable emulsion which can be used for the control of fungus diseases, and, on account of its content of mineral oil, also for the control of insect pests, and to prevent their attack on seeds and plants. This emulsion is also very effective for the control of sap stain of lumber, and like diseases of cellulose products.

Example 6

16.35 parts of mercury oxide, 43.2 parts of stearic acid, 12.25 parts of tetra ethyl lead, and 928.2 parts of kaolin are milled together for 20 hours. The finished dust, containing ethyl mercury stearate as the active ingredient, can be used immediately as a seed disinfectant.

The following example of the preparation of phenyl mercury oleate is given to illustrate how the products may be produced by the double exchange process:

Example 7

31.25 parts of phenyl mercury chloride and 30.4 parts of sodium oleate are heated in 400 parts of absolute alcohol for 15 m. on the boiling water bath. After cooling to room temperature, the sodium chloride is filtered off and the alcohol evaporated on the water bath. The phenyl mercury oleate remains as a very viscous oil. It is soluble in alcohol, acetone, mineral and vegetable oils, insoluble in water.

By the term "dry process" as used herein, it is to be understood that the materials are to be used in their commercially available form containing only the small percentage of water as is present under normal conditions.

It is to be understood that the foregoing examples are illustrative only and that our invention is to be limited only as indicated in the following patent claims:

We claim:

1. The reaction product of a phenyl mercury compound and a salt of a higher fatty acid of a saponifiable fat.
2. Phenyl mercury oleate.
3. Phenyl mercury stearate.
4. Phenyl mercury palmitate.
5. The process of producing a fatty acid salt of a non-substituted hydrocarbon which comprises reacting a non-substituted hydrocarbon mercury hydroxide with a fatty acid of a saponifiable fat.

MAX ENGELMANN.
ALBERT L. FLENNER.

DISCLAIMER 1,993,777.—*Max Engelmann* and *Albert L. Flenner*, Wilmington, Del. MERCURY COMPOUND AND PROCESS OF MANUFACTURING. Patent dated March 12, 1935. Disclaimer filed November 10, 1939, by the assignee, *E. I. du Pont de Nemours and Company*.

Hereby enters this disclaimer as to claim 1 of the said patent.
[*Official Gazette December 5, 1939.*]